United States Patent [19]
Greenig et al.

[11] 4,307,409
[45] Dec. 22, 1981

[54] MULTI-APERTURE, FEEDBACK SYSTEM FOR A LASER SCANNER

[75] Inventors: Nelson L. Greenig, Norristown; Richard M. Shelton, Oreland, both of Pa.

[73] Assignee: Sperry Corporation, New York, N.Y.

[21] Appl. No.: 153,362

[22] Filed: May 27, 1980

[51] Int. Cl.³ ............................................. G01D 15/14
[52] U.S. Cl. .................................. 346/108; 358/293; 358/300; 250/227
[58] Field of Search .............. 346/108, 76 L; 358/285, 358/288, 293, 294, 300, 302; 250/227; 350/6.8, 6.7, 96.24, 96.25, 6.9, 6.91

[56] References Cited
U.S. PATENT DOCUMENTS

| 3,441,949 | 4/1969 | Rolon | 350/6.91 X |
| 3,750,189 | 7/1973 | Fleischer | 346/74 ES |
| 3,835,249 | 9/1974 | Dattilo et al. | 358/285 |
| 3,898,580 | 8/1975 | Millsap | 331/15 |
| 3,938,182 | 2/1976 | McKenna | 360/26 |
| 3,977,762 | 8/1976 | Sandbank | 350/96.15 |
| 4,000,368 | 12/1976 | Tisue | 358/264 |
| 4,002,829 | 1/1977 | Hutchison | 358/206 |
| 4,019,186 | 4/1977 | Dressen | 346/108 |
| 4,032,888 | 6/1977 | Broyles | 340/146.3 F |
| 4,037,231 | 7/1977 | Broyles | 346/108 |
| 4,044,363 | 8/1977 | Morgan | 359/5 |
| 4,071,754 | 1/1978 | Roulund | 250/227 |

OTHER PUBLICATIONS

Correction of Axial Deflection Errors in Rotating Mirror Systems, by J. Helmberger; K. Stadler, F. Bestenreiner.

Phase-Locked Loop Systems; by Motorola Semiconductor Products Inc.

Primary Examiner—L. T. Hix
Assistant Examiner—W. J. Brady
Attorney, Agent, or Firm—Robert E. Lee, Jr.; Kenneth T. Grace; Marshall M. Truex

[57] ABSTRACT

A beam feedback synchronization system for optical sweeping apparatuses is disclosed. The system includes a multi-faceted rotating reflection mirror which acts on a collimated light beam such as a laser beam to cause it to sweep periodically in parallel straight lines across a rotating photoconducting drum. A portion of the light beam is split off and caused to sweep across an equispaced linear array of fiber optic apertures held in place by a fiber optic assembly. The light entering the fiber optic apertures is carried along fiber optic elements to one or more photodetectors which generate periodic electrical signals in response thereto. The frequency of occurrence of the electrical signals from the photodetector is a measure of the velocity of the sweeping light beam across the fiber optic array. A phase locked loop circuit connected to the photodetector(s) provides a character clock signal which is synchronized to the electrical signals received from the photodetector and compensates for variations in the speed of the light beam across the fiber optic array. The phase locked loop further comprises a fast synchronization circuit which provides immediate synchronization between the character clock signal and the first electrical signal occurring at the beginning of a new light beam sweep. In addition, hold circuitry is provided which holds the frequency of the character clock signal coming from the phase locked loop constant during the dead time occurring between laser light beam sweeps.

4 Claims, 11 Drawing Figures

MULTI-APERTURE, FEEDBACK SYSTEM FOR A LASER SCANNER

BACKGROUND OF THE INVENTION

This disclosure relates to optical sweeping systems, and particularly to non-impact printers and facsimile machines of the laser type.

In optical sweeping systems, a collimated light beam, for example, a laser light beam, is reflected by a rotating, multifaceted mirror. The rotating mirror causes the reflected light beam to sweep periodically in fan-like fashion across a moving target surface, the end of the beam tracing out a plurality of straight lines thereon. By sweeping, it is meant that the direction of the light beam reflected from a side of the mirror changes over a fixed angle as the mirror rotates until the light beam moves off the side of the mirror onto the next side of the mirror to begin the sweep all over again. The direction of the beam changes at a constant rate, that is, the direction of the beam changes by the same angular amount for a given time interval at either end of the sweep, at the center of the sweep or anywhere else during the sweep. Because of this and because the distance to the straight line path on the target surface from the reflection point on the mirror is greater at the ends of the sweep than at the middle, the end of the reflected beam covers a greater distance along the straight line path at the ends than at the middle of the path during the same time interval. This is often referred to in the art as the tangential velocity of the beam and it varies during the sweep being greater at the ends of the sweep and less in the middle.

In laser printers, the light beam is modulated before reflection in accordance with selected patterns of bit signals which represent alphanumeric characters which are stored in a character generator memory as a matrix of ones and zeros. A character clock signal gates the individual bit signals from the character generator and the bit signals are transmitted to an RF signal source which, for example, transmits RF signals when high bit signals (ones) are received and no RF signals when low bit signals (zeros) are received. Each sweep of the light beam is modulated in accordance with at least one row of ones and zeros of a plurality of matrices stored in a character generator memory for imaging as a portion of a line of alphanumeric characters on a photosensitive surface.

The RF signals are transmitted to a light beam modulator which is positioned in the path of the collimated light beam and which causes a portion of the light beam to be diffracted through a specific angle (called the Bragg angle) along a deflected path when RF signals are present at the modulator. The portion of the beam traveling along the deflected path is called the first order beam while the undeflected beam is called the zero order beam. The zero order beam is always present although with less energy when the first order beam is present. Together, the first and zero order beams form a modulated light beam.

The modulated light beam then passes through an optical system that controls the focus and size of the beam, and directs the beam to a rotating multifaceted mirror where the beam is swept as described above. As the modulated light beam follows the straight line path on the photosensitive surface during a sweep, the zero order beam is prevented from impinging on the photosensitive surface. When it is desired to image a dot along the straight line path, the first order beam is switched on in a manner as described above. Otherwise, a space is left on the straight line path. If the character clock signal which gates the individual bit signals from the character generator which causes the switching on of the first order beam, has a constant frequency, then the separation between adjacent dots and spaces at the ends of the straight line path is greater than at the center of the straight line path because of the variation in tangential velocity of the end of the sweeping light beam which was described above. This causes spreading of the subsequently imaged characters located at the ends of parallel straight line paths on the photosensitive surface. That is, characters imaged at the ends of the photosensitive surface are wider than the same characters imaged at the center. This results in nonuniform printing which gives an undesirable appearance and result.

U.S. Pat. No. 3,835,249 (Dattilo et al) discloses a synchronization device for generating a real time synchronization signal for utilization with a scanning light beam. The device is summarized at columns 1 and 2 of the patent. It includes: means for splitting the main scanning beam; an optical grating; an optical system having first and second optical foci; and a light detection device. Light split from the main scanning beam passes through the optical grating before impinging on the light detection device located at the second foci of the optical system. The output signal from the light detection device may be utilized to clock information into the light beam by modulating it or to clock information from the light beam imparted thereto by scanning a document.

The periodic spacing of optical grating lines along a straight line provides information with respect to the tangential velocity as it varies along the straight line path. In the synchronization device disclosed in U.S. Pat. No. 3,835,249, the output of the light detection device after amplification, limiting and clipping, is used either directly or after frequency doubling as a clocking signal. If the output of the light sensitive device is used directly as a clocking signal, then the number of optical grating lines must be the same as the number of dot spaces in a line of sweep. Such a grating would be difficult to fabricate for existing sweeping systems employing greater than 200 dot spaces per inch density while still minimizing the size of the synchronization system. This would be true even if the spacing between optical grating lines were doubled. Presumably, the frequency doubling of the output could be cascaded any number of times to thereby minimize the number of grating lines. However, in such a system the resultant character generator clocking signal rate would be an integer multiple of two times the number of grating lines occurring in the optical grating. This in turn requires that the fonts used for storing alphanumeric characters be related to the optical line grating since the grating determines the clocking rate. It is desirable that flexibility be maintained in the selection of character fonts to enable use of the optical sweeping device for a maximum number of applications. It is undesirable, therefore, to restrict the font description that can be used with a given optical sweeping device by the selection of a particular spacing in an optical grating as required by U.S. Pat. No. 3,835,249.

In addition to U.S. Pat. No. 3,835,249 described above, U.S. Pat. No. 4,019,186 (Dressen et al) relates to scanning beams in non-mechanical printers. U.S. Pat.

No. 4,019,186 discloses a light beam motion pick up device comprising a light transmission rod having a plurality of marks thereon. The device provides timing pulses to aid in the printing of characters on a recording surface at uniform intervals along a line. A portion of the scanning light beam is scanned along the rod and whenever it strikes one of the plurality marks it is scattered and the scattered light travels inside the rod to a photo-electric element which provides timing signals after amplification. However, in order to provide a clocking signal for each dot or space forming a character in a dot matrix printer it would be necessary to provide a mark for each such dot or space along the length of the light transmission rod. This could amount to as many as 200 or more marks per inch.

SUMMARY OF THE INVENTION

The present invention provides an improved feedback synchronization system for optical sweeping apparatuses. The system comprises a rotating reflecting means which acts to reflect a collimated light beam causing it to sweep periodically in straight lines across a target surface. A portion of the reflected light beam is split off and is caused to sweep across a linear array of fiber optic apertures held in place by molded plastic forming a fiber optic assembly. The fiber optic apertures carry the light to one or more photodetectors which generate electrical signals in response thereto. The period between the electrical signals provides a sampling of the tangential velocity of the sweeping light beam across the target surface. Since the sample beam is split from the main beam, of which a portion impinges on the target surface after reflection from the rotating mirror, then the tangential velocity of the sample beam detected by the fiber optic array, is virtually identical to the tangential velocity of the main beam across the linear path on the target surface.

A circuitry means connected to the photodetector(s) provides a variable clock signal which is synchronized to the electrical signals received from a photodetector and compensates for the variation in tangential velocity, thereby resulting in uniform dot spacing of information storage. In the preferred embodiment, the circuitry means comprises a phase locked loop circuit including a phase detector, a voltage controlled oscillator (VCO) whose frequency is many times the frequency of the electrical signals from the photodetector and two stage counter circuitry. The phase detector provides an output voltage to the VCO which is proportional to (a) the phase difference between the incoming electrical signals and (b) the output of the voltage controlled oscillator as divided down by the two stage counter circuitry. The variable clock signal is the output of the voltage controlled oscillator as measured through the first stage of the counter circuitry.

The circuitry means for providing the variable clock signals further comprises fast synchronization circuitry which immediately synchronizes the variable clock signal with the first electrical signal occurring with the arrival of a new light beam sweep striking the target surface. This is necessary because of the dead time preceding each new light beam sweep.

The circuitry means includes hold circuitry means which freezes the voltage controlled oscillator frequency a short time after the last electrical signal (of a light beam sweep leaving the target surface) is received. The hold circuitry prevents any change in the VCO frequency during the dead time until the first synchronization circuitry synchronizes the variable clock signal with the first electrical signal of a new light beam sweep striking the target surface. Since the tangential velocity of the sweeping beam at the end of a sweep is approximately the same as the tangential velocity at the beginning, freezing the frequency of the VCO at the end of sweep provides a good estimate of the VCO frequency required at the beginning of the next sweep thereby aiding fast synchronization.

It is an advantage of the present invention to provide an inexpensive, reliable and flexible beam feedback synchronization system for optical sweeping apparatuses.

It is another advantage of the present invention to provide an inexpensive, reliable and flexible means for eliminating rotating mirror errors in laser printers and laser facsimile apparatuses.

It is another advantage of the present invention to provide a variable clocking signal for the uniformly spaced printing or detection of data in optical sweeping apparatuses.

It is a further advantage of the present invention to provide a means for immediate synchronization of the variable clocking signal with the beginning of each light beam sweep.

Another advantage of the present invention is to provide a sampling of the sweeping light beam in the beam feedback synchronization system, the periodicity of said sampling being substantially less than the variable clocking rate.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE DRAWINGS

Figure 1:
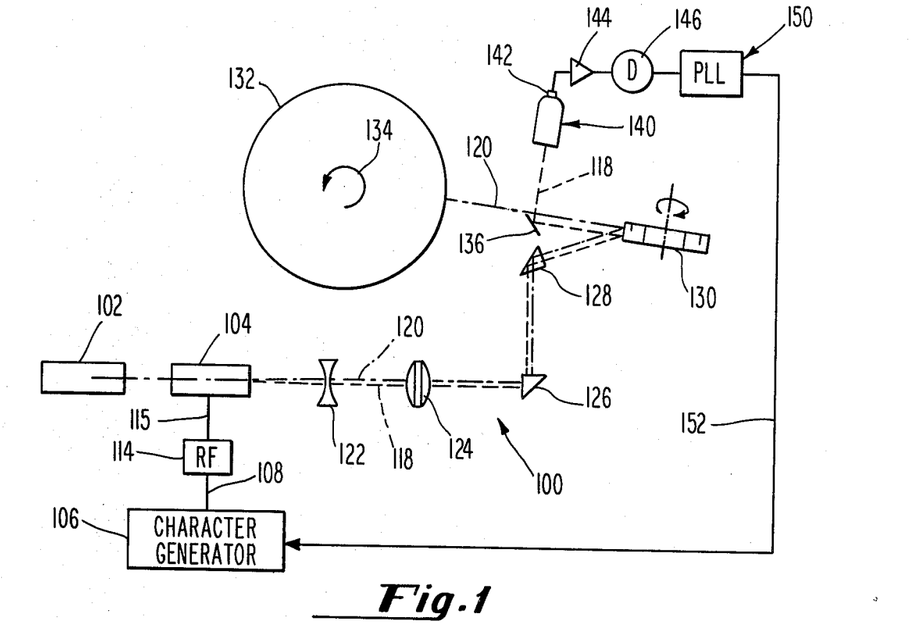
FIG. 1 is an elevational schematic of the beam feedback synchronization system in a laser printer system.

FIG. 1 shows a laser printer designated generally 100. A laser light source 102 transmits a collimated light beam to light beam modulator 104. Signals which designate data bits, ones or zeros, from character generator 106 and which represent portions of alphanumeric characters to be printed by the laser printer 100 are sequentially transmitted over line 108 to RF generator 114. If a one bit signal is transmitted, RF generator 114 transmits an RF voltage over line 115 to light modulator 104, otherwise no RF voltage is transmitted. The individual bit signals are gated or clocked from character generator 106 by a character generator clocking signal.

In the preferred embodiment, the light beam modulator 104 is a piezoelectric crystal device such as a Coherent Radiation Model No. 305 acousto-optical modulator. In response to RF voltages, the light beam modulator 104 establishes acoustic vibrations which cause a portion of the input light beam to be diffracted through a specific angle, called the Bragg angle, along a deflected path. The portion of the beam travelling along the deflected path is called the first order beam 120 while the undeflected beam is called the zero order beam 118. Together, the first and zero order beams 120 and 118 form a modulated light beam.

After passing through the light beam modulator 104, the modulated light beam comprising both the zero order beam and first order beam passes through negative lens 122 (Mellos Griot Part No. 01LDK017) and adjustable positive lens 124 (Mellos Griot Part No. 01LDX149) which together cooperate to control the size and focus of the zero and first order beams. From there, the modulated beam impinges first on prism 126 (Mellos Griot Part No. 01PRS013) which changes the direction of travel of the light beam directing it to prism 128 (Mellos Griot Part No. 01PRS013) which changes the direction of travel of the light beam a second time. From prism 128, the modulated light beam impinges upon a multi-faceted rotating reflection mirror 130.

Rotating reflection mirror 130 acts on the modulated beam reflecting it toward photoconducting drum 132 while at the same time causing it to sweep repeatedly in fan-like fashion within a planar region. In the preferred embodiment, only first order beam 120 is enabled to impinge upon the surface of photo-conducting drum 132. Hence, when ones stored in the character generator memory are transmitted as high bit signals to RF generator 114 which causes RF pulses to be transmitted to light beam modulator 104 which in turn causes first order beam 120 to be switched on, then light impinges on photoconducting drum 132 to image a dot thereon.

Photo-conducting drum 132 is caused to rotate in the direction of curved line and arrow 134 while the periodically sweeping laser beam traverses a series of parallel straight lines across the surface of the drum. The straight lines are parallel to the axis of the drum.

Figure 2:
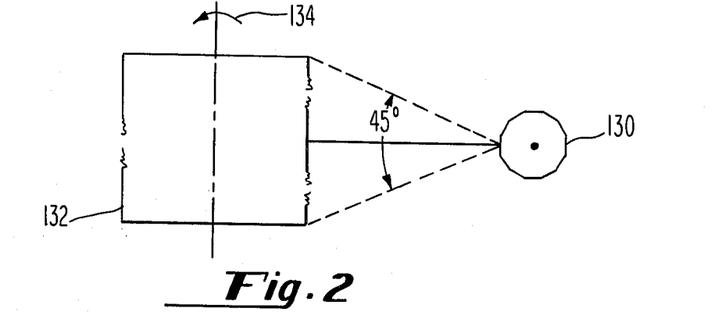
FIG. 2 is a top planar schematic of a portion of FIG. 1.

Rotating mirror 130 is a highly polished multi-faceted mirror having 12 sides in the preferred embodiment and rotating at a speed of 1575 revolutions per minute. A 12 sided mirror is capable of providing a 60° angle sweep, but, in the preferred embodiment, only 45° or 75% of the sweep is utilized leaving about 25% of the sweep unused. (See FIG. 2). The time between each used portion of the sweep is known as the dead time. With this mirror speed, adjacent straight lines traversed on photoconducting drum 132 are designed to be approximately 10 mils apart. Since the first order light beam is caused to switch on and off at an RF frequency of many megacycles (40 MHz in the preferred embodiment), each straight line path is comprised of many possible dot spaces (approximately 1,200 in a 10 inch straight line segment). When the first order beam strikes the drum, a dark dot will be recorded on the final output of the printer. When the beam is not present, a white space is left. In this way, alphanumeric characters are printed as a series of dots and no dots in accordance with data bits stored in the character generator.

Figure 11:
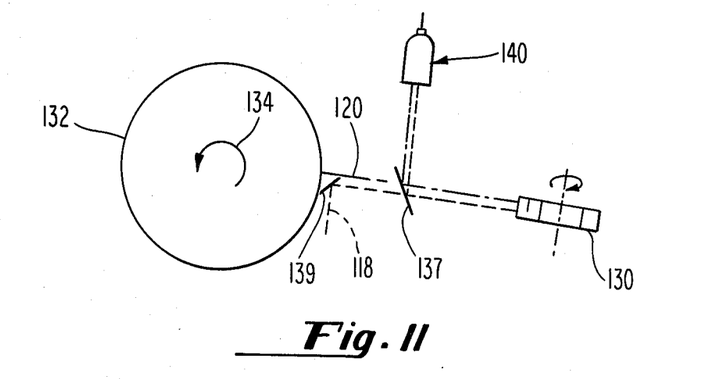
FIG. 11 is an alternate embodiment of a portion of the beam feedback system of FIG. 1.

Straight reflecting mirror 136 reflects zero order beam 118 out of the planar region and onto the fiber optic assembly designated generally 140 where the zero order beam 118 traverses a straight line synchronization path thereon. The zero order beam is about 125 mils below the first order beam as a result of the deflection caused by light beam modulator 104. Therefore, the zero order beam 118 can be deflected out of the planar region without disturbing the first order beam 120. Alternatively, a portion of the entire modulated light beam, including first and zero order beams, can be deflected onto fiber optic assembly 140 by a partially silvered mirror 137 (See FIG. 11) while the remainder of the beam passes through the mirror within the planar region. Mirror 139 in FIG. 11, located in close proximity to drum 132 reflects beam 118 away from the drum 132 but leaves the portion of first order beam 120 which passes through mirror 137 unaffected.

Fiber optic assembly 140 comprises a plurality of fiber optic cables, not shown in FIG. 1, whose ends are formed to provide a linear array of fiber optic apertures disposed along the synchronization path. The fiber optic cables carry light signals entering the apertures to one or more photodetector assemblies 142 which provide a series of sequential electric signals in response to the light signals. The electrical signals are suitably amplified by differential amplifier 144 and digitized by digitizer circuitry 146 (Signetics amplifier 529). Before entering amplifier 144, the electrical signals are typically small current pulses which exit from differential amplifier 144 as a series of approximately 1 volt, low voltage signals whose amplitudes are not uniform. Digitizing circuitry 146 operates on the signals to provide uniform 5 volt pulses of uniform duration suitable for operation with conventional TTL digital circuitry. The operation of digitizer 146 is well known and will not be described herein.

The resultant modified electrical signals, called light pulses digitized signals enter beam feedback circuitry designated generally 150 which provides a variable clock signal over line 152 to character generator 106.

As rotating mirror 130 rotates, it changes the direction of travel of the reflected light beam over a 60 degree angle at a constant rate. However, as the first order beam impinges upon a target surface along a straight line path, the velocity of travel of the first order beam 120 along the straight line path (tangential velocity) is not constant. As a result, the speed with which the first order beam 120 moves along the straight line on the target surface is faster at either end of the sweep and slowest in the middle. Hence, as described earlier adjacent dot spaces are further apart at the ends than in the middle and this causes printed characters to spread out at the ends of a line of print. This is undesirable since it is required that all dot spaces be separated by a uniform amount. This is particularly important when graphic forms are overlayed on the printed data so that the data appears in the proper place on the form. In the preferred embodiment, where the minimum distance between the target surface and rotating mirror is 12.3" and a line of sweep is 10" wide, the error in locating a dot at either end of a line of sweep can be as much as 300 mils. It is desirable to keep the error to a fraction of a dot diameter which error in the preferred embodiment is 7 mils or less where the dot diameter is 14 mils.

One manner of correcting the tangential velocity error is to provide character generator clocking signals which speed up at either end of a line of sweep and slow down as the sweep approaches the center as a function of the tangential velocity of the light beam sweep. The information necessary to accomplish this in the preferred embodiment is derived from the fiber optic assembly sampling of the zero order beam and the operation of the synchronization circuitry 150. Since the zero order beam is caused to sweep at the same time as the first order beam by the rotating mirror 130, and since the path travelled by the zero order beam from rotating mirror 130 to reflecting mirror 136 and then to the linear array of fiber optic apertures in fiber optic assembly 140 is the same distance as the path travelled by the first order beam from rotating mirror 130 to photo-conducting drum 132, the tangential velocity of the zero order beam across the linear array of fiber optic apertures is the same as the tangential velocity of the first order beam along a straight line path on photo-conducting drum 132.

Velocity errors due to fluctuations in the rotating mirror speed and geometrical imperfections in the mirror surfaces are also compensated for with the arrangement of this invention.

Figure 3:
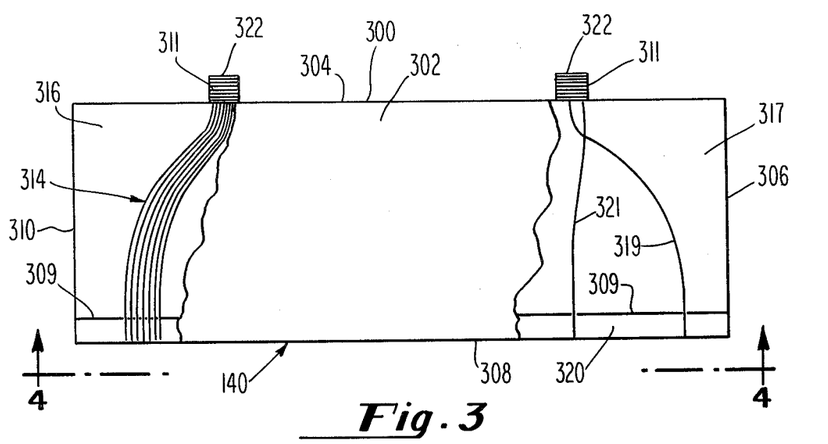
FIG. 3 is a top planar view of the preferred embodiment of a portion of FIG. 1 shown with portions cut away.

FIG. 3 is a top planar view of the fiber optic assembly 140 of FIG. 1 with portions shown cut away. The assembly 140 can be made of any suitable rigid material but is preferably an inexpensive material such as plastic. The assembly comprises a housing 300 which is rectangular in shape defined by the top and bottom parallel planar surfaces such as top planar surface 302 and even numbered sides 304 through 310 although other shapes could be utilized so long as side 308 which contains the fiber optic apertures is flat and straight. Two threaded fiber optic cable holders 311 are shown attached to side 304 opposite side 308.

A plurality of fiber optic elements designated generally 314 is shown extending between side 308 and left most holder 311 in cut away region 316. Each fiber optic element can be either a plurality of very small diameter (approximately 2 mil) glass fiber optic cables or one or more large diameter plastic fiber optic cables.

Figure 4:
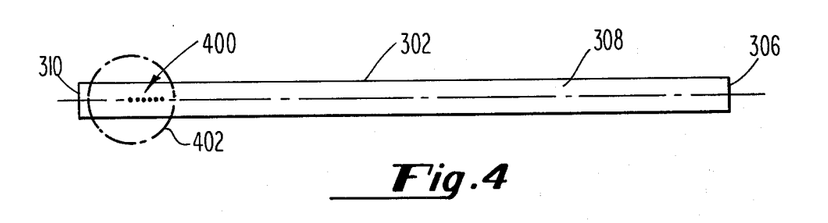
FIG. 4 is a planar elevational view of the preferred embodiment portion of FIG. 3.

FIG. 4 is an elevational planar view of FIG. 3 taken along the lines and arrows 4—4 in FIG. 3. Each of the fiber optic elements 314 ends at flat side 308 forming a linear array of equispaced fiber optic apertures depicted by dots designated generally 400 within dashed circle 402. Each of the dots is in reality an aperture which allows light impinging thereon to enter the fiber optic element and be carried therein to impinge upon an active area in a photodetector when the photodetector is attached to holder 311. In the preferred embodiment, each of the apertures 400 is spaced, 0.100 inches apart center to center with approximately 105 apertures contained within side 308.

Figure 5:
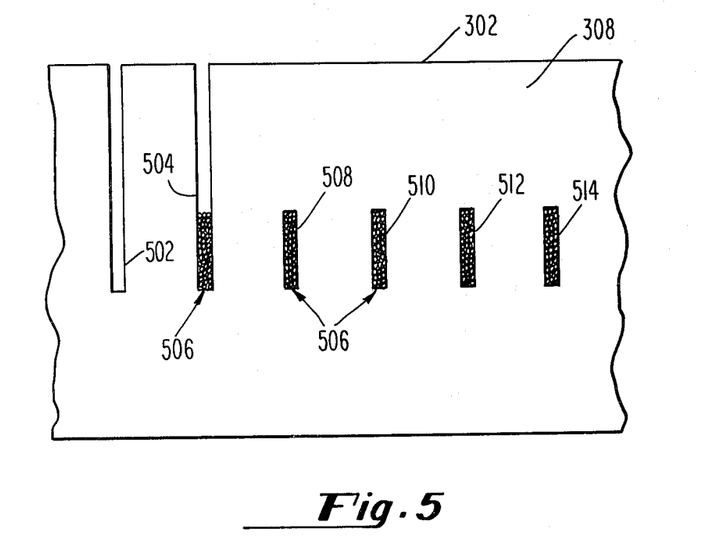
FIG. 5 is an enlarged planar elevational view of a portion of FIG. 3 contained within the circle 3 in FIG. 3.

FIG. 5 is an enlarged view of the portion of FIG. 4 within dashed circle 402 and showing the fiber optic assembly 140 in various stages of assembly. Before the fiber optic elements are inserted into assembly 140 slots are formed in a frontal portion (320 in FIG. 3) of the assembly 300. Slots 502 and 504 are two such slots in FIG. 5. The slots are equally spaced at a separation equal to the desired separation between fiber optic apertures. Slot 502 is shown empty but slot 504 is partially filled with small diameter glass fiber optic cables designated generally 506. After the fiber optic cables are inserted into the slots, the unfilled portion of the slots are filled with plastic leaving fiber optic apertures such as apertures even numbered 508 through 514 in face 308. Each of the apertures in the preferred embodiment is 0.020" wide and 0.050" high and spaced 0.100" apart center to center.

The slotted region 320 in FIG. 3 acts to properly align the fiber optic cables in a linear array in side 308. Once beyond region 320, the fiber optic assembly becomes hollow and the fiber optic elements are laid within the hollow region extending from side 309 to side 304. The fiber optic elements are collected and glued together at one end and held fixed within the holder 311 which holder extends through side 304. The ends of the fiber optic cable within each fiber optic element are polished at side 308 and are polished into a plane 322 at or near the end of the threaded holder 311. Hence, at side 308 the ends of the fiber optic elements are formed into a linear array of polished apertures, each aperture carrying a plurality of small diameter glass fiber optic cables. At side 304, a plurality of fiber optic elements, each element comprising a plurality of glass fiber optic cables, are collected together and form a polished plane of fiber optic cable endings. A photodetector (Centronic OSD 50-5PV) is screwed onto the threaded holder 311 in such a way as to dispose the planar active region of the photodetector into close proximity to the polished plane of fiber optic cable endings. Light entering the fiber optic element apertures and fiber optic cables contained therein is carried by the fiber optic elements on bundles of fiber optic cables to photodetectors attached to holder 311. Together, the holder 311 with photodetector attached thereto forms photodetector assembly 142 in FIG. 1.

Alternatively, each aperture could be round and contain one or more larger round fibers, typically plastic-glass such as Crofon. In this case each fiber optic element would contain one or more larger fiber optic cables and not a plurality of small diameter fiber optic glass cables.

In cut away region 316, the fiber optic elements nearest the side 310 of the assembly 140 are shown entering the holder 311 nearer the perimeter of the holder than the center. However, when light enters the cables making up a fiber optic element at an angle to the axes of the individual cables, it leaves the other ends of the cables in a conical pattern with light leaving in the direction parallel to the axes of the individual cables. Light enters the fiber optic elements nearest the sides 310 and 306 of fiber optic assembly 140 at the greatest angles, and if these fiber optic elements enter the holders 311 near the perimeters of the holders then a certain amount of light leaving the cables making up these fiber optic elements can be lost because of the conical pattern. Cut away region 317 shows an alternate and improved way of feeding the fiber optic elements into the holder 311. It should be noted that a fiber optic element 319 located near side 306 of fiber optic assembly 140 enters holder 311 in the center region of holder 311 while fiber optic element 321 located nearer to the center of fiber optic assembly 140 than fiber optic element 319 enters the holder 311 near the perimeter of that holder. Light entering fiber optic element 321 will have substantial light leaving fiber optic element 321 in a direction parallel to the axis of that element because it enters fiber optic element 321 at an angle to the axes of fiber optic element 321 which is small.

Figure 6:
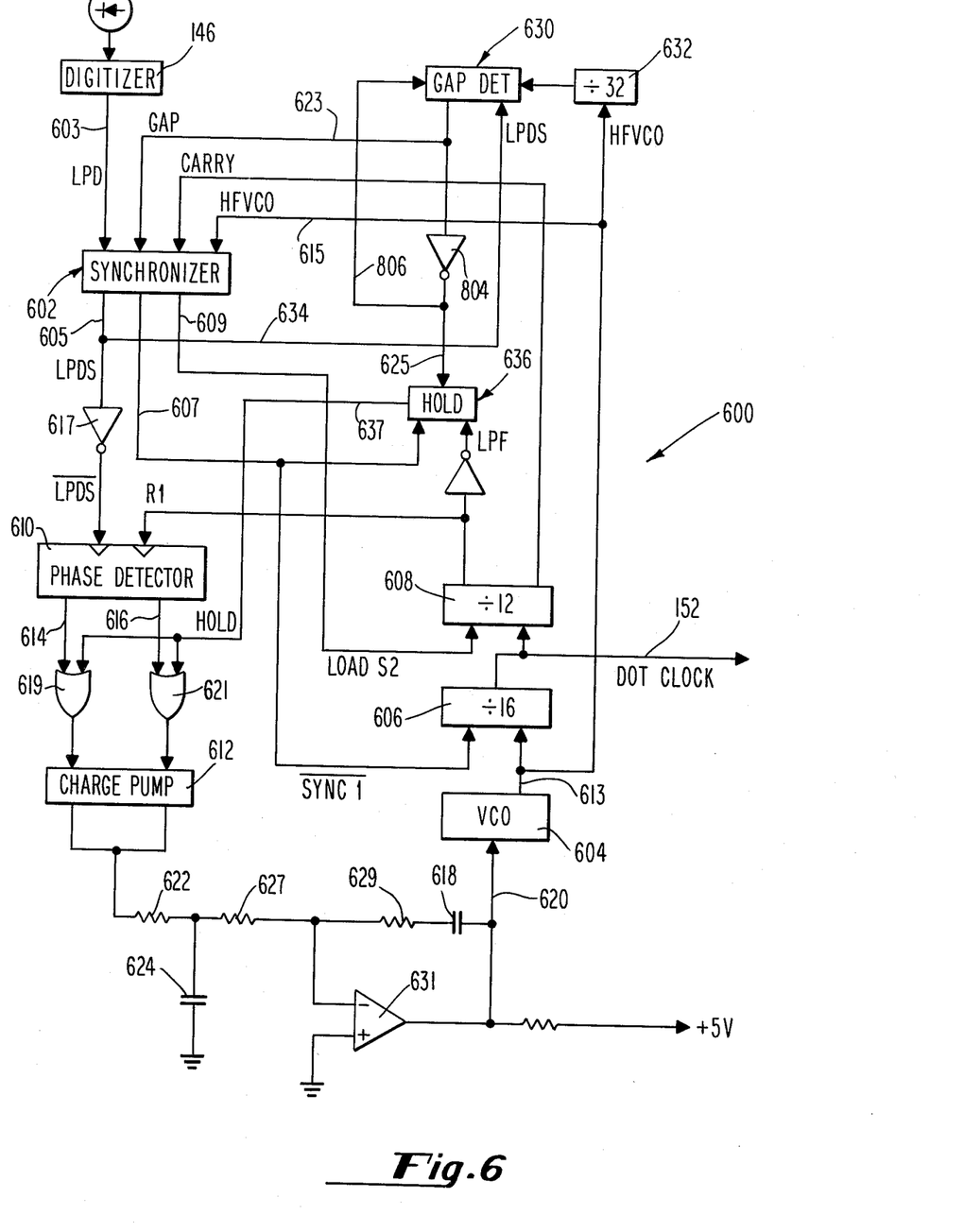
FIG. 6 is a circuit schematic of the circuitry portion of the beam feedback synchronization system of FIG. 1.

Referring now to FIG. 6, a preferred embodiment block diagram schematic of the synchronization circuitry means designated generally 600 of the present invention is described. It comprises a synchronizer circuitry portion designated generally 602. Synchronizer circuitry portion 602 accepts several input signals including the light pulse digitized signals (LPD signals over line 603) described earlier from digitizer circuitry 146, and transmits light pulse digitized and synchronized signals (LPDS signals over line 605). The LPDS signals after inversion by inverter 617 provide basic reference signals ($\overline{\text{LPDS}}$) for the remaining synchronizing operation to follow. In addition, synchronizer circuitry portion 602 provides ancillary synchronization signals over lines 607 and 609 to other portions of the synchronization circuitry means 600.

The synchronization circuitry means 600 further comprises a voltage controlled oscillator (VCO) 604 which provides a train of high frequency square wave signals (HFVCO signals over line 613) the output frequency of which is variable in proportion to a DC voltage applied to the VCO. A preferred embodiment VCO is a TTL compatible 74S124. The range of frequencies over which the VCO operates is many times the frequency of the LPD signals. Refer to the timing diagram in FIG. 7 where the duration of a single LPD signal 702 is seen to include many HFVCO signals 700 of a given frequency within the VCO frequency output range. In FIG. 6, HFVCO signals are also provided as input signals to synchronizer circuitry portion 602 over line 615.

In the preferred embodiment, the center operating frequency of the VCO is approximately 6.0 MHz while the average frequency of the LPD signals is approximately 31.5 KHz. Therefore, the VCO frequency is approximately 192 times the LPD frequency. Accordingly, counter circuitry 606 and counter circuitry 608 comprised of 74161 TTL devices devide the VCO frequency by 192 which provides a signal R1 for phase comparison with the LPDS signals by phase detector 610. Phase detector 610 compares the difference in time of arrival between the leading edges of the negative going $\overline{\text{LPDS}}$ (LPDS signals inverted by inverter 617) and R1 signals which are both low active signals. A signal proportional in magnitude to the difference in the arrival time between the LPDS and R1 signals is transmitted to charge pump 612 over line 614 via OR gate 619 or over line 616 via OR gate 621 depending on whether the incoming $\overline{\text{LPDS}}$ signal leads or lags the incoming R1 signal respectively. The charge pump provides a current signal out which either charges or discharges capacitor 618 depending on which line, 614 or 616, is activating the charge pump. The charge of capacitor 618 controls the DC voltage applied to VCO 604 via line 620. The resistor 622 and capacitor 624 form an RC filter circuit to ground which filters out unwanted high frequency signals generated at various points within synchronization circuitry means 600.

Resistors 627 and 629, capacitor 618 and differential amplifier 631 provide a type 2 integrator circuit connected between charge pump 612 and VCO 604. Such integrator circuits are well known in the art and they provide a linear and repeatable voltage change to VCO 604 as a function of the magnitude and duration of a step voltage change from charge pump 612.

A suitable phase detector 610 and charge pump 612 are made by Motorola as a combined function listed as model MC4344/4044. Also provided are suitable parameters needed for design of the filter and integrator circuits described above.

As the frequency of the arriving LPD signals vary because of the tangential velocity errors, the frequency of the VCO is caused to change by operation of the loop described above. The variable character generator clock signals are provided by the output of counter circuitry 606 and transmitted over line 152 as in FIG. 1. Since the apertures in the fiber optic assembly 140 are separated by about 0.100 inches and there are roughly 12 dot spaces between apertures, the character clock signals must be 12 times the LPDS frequency. Hence, the character clock signal is transmitted from the counter circuitry 606 before being divided by 12 by counter circuitry 608.

It was mentioned previously that approximately 75% of the light beam sweep caused by each facet of the rotating mirror is utilized to write on the target surface. The remaining 25% of the sweep causes a gap to occur in time between subsequent laser sweeps. It is an advantage to provide detection circuitry to detect the end of this gap or dead time. The gap detector circuitry portion designated generally 630 transmits a GAP signal over line 623 to the synchronizer circuitry portion 602 which then cooperates with the remainder of the synchronizing circuitry means 600 to provide fast synchronization between the output of the VCO and counter circuitry portions 606 and 608 with the LPDS output of the synchronizer circuitry portion 602. This is desirable so that at the beginning of a new sweep, after the occurrence of the 25% dead time, the synchronizer circuitry portion 600 provides a variable character clock signal which is synchronized with the light pulses arriving from the fiber optic assembly 140 starting with the first light pulse striking a target with a new sweep. Synchronization as used herein means that the character clock signals are maintained in step with the LPDS signals but not on a one to one basis since there are approximately twelve times as many clock signals as LPDS signals. However, the R1 signals which are derived from the clock signals are synchronized one to one and in turn drive the VCO which is the source of the clock signals. The gap detector circuitry portion 630 receives as inputs: the high frequency VCO signals divided by 32 by the counter circuitry 632; and the LPDS signals over line 634 from synchronizer circuitry portion 602. The gap detector circuitry portion 630 is described in further detail in reference to FIG. 8.

At the end of a laser sweep, the LPDS signals from synchronizer circuitry portion 602 stop, but during the following dead time, the R1 signals coming from the continuously oscillating VCO 604 through counter circuitry 606 and 608 continue to arrive at phase detector circuitry 610. If the output of the phase detector over lines 614 and 616 to charge pump circuitry 612 were not blanked during this time the charge pump would drive capacitor 618 to a maximum plus or minus DC voltage on VCO 604 thereby changing the output frequency of R1 considerably. This would result in wide frequency differences between R1 and LPDS signals with the start of the next laser sweep making it difficult to synchronize them. Hence, hold circuitry designated generally 636 is provided which transmits a hold signal over line 637 to OR gates 619 and 621 which blanks the output of phase detector circuitry 610 on lines 614 and 616 respectively to the charge pump circuitry 612 during the gap interval. Details of the hold circuitry 636 are provided in FIG. 10.

Figure 8:
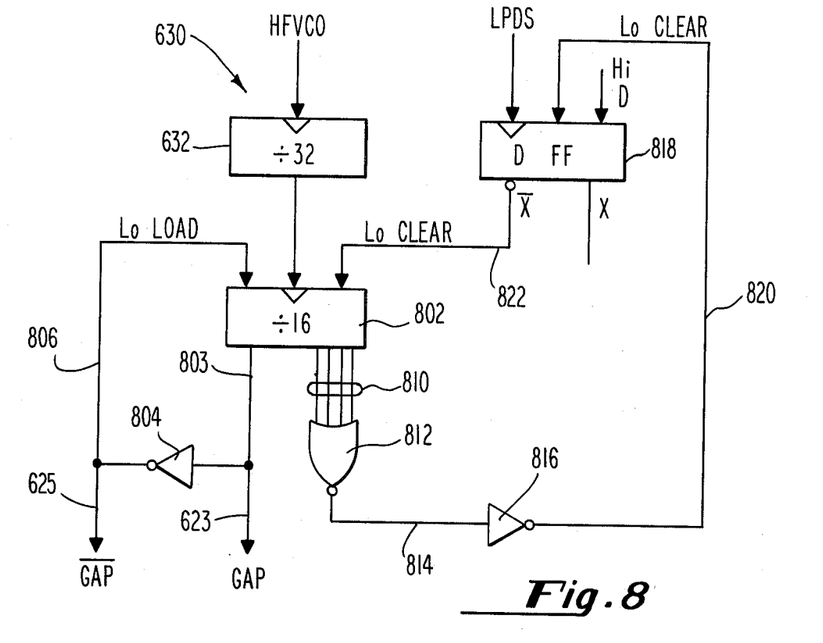
FIG. 8 is a circuit schematic of a portion of the circuitry of FIG. 6.

Referring to FIG. 8 the details of gap detector circuitry portion 630 are shown. Counter circuitry 632 divides the frequency of the HFVCO signals by 32. The frequency is then divided again by 16 by further counter circuitry 802. The carry out signal from counter circuitry 802 is the GAP signal which is transmitted to synchronizer circuitry portion 602 over line 623 and which is also transmitted to hold circuitry 636 over line 625 after being inverted by inverter 804. If counter circuitry 802 is allowed to reach full count and a high carry signal is transmitted over line 803, on the next signal, then a low signal will be furnished (because of inverter 804) over line 806 to the load port of counter circuitry 802. In the preferred embodiment, the counter is programmed when a low load signal is present, to load ones into the counter. With receipt of the next clock signal the counter provides a carry out over line 803 and all zeros are transmitted from the bit positions indicated by the four lines 810. The carry out signal over line 803 again causes a low load signal to be entered into counter 802 via inverter 804 and line 806. Hence, once a carry out signal is furnished over line 803 it is self perpetuating via the inverter 804 and load operation via line 806 until the counter is cleared.

All zeros on lines 810 to NOR gate 812 causes a high signal to occur on line 814 where it is inverted by inverter 816. Inverter 816 then provides a low signal to the clear port of flip flop 818 over line 820. When a low signal is provided over line 820 to clear D flip flop 818 this provides a high signal over line 822 to the clear position on counter 802. Since counter 802 requires a low clear signal, the operation of the carry out signal on line 803 continues.

The above described operation of the gap detector circuitry 630 to furnish a continuously occurring gap signal over line 803 is interrupted upon receipt of the first LPDS signal arriving at D flip flop 818. As the leading edge of the first LPDS signal occurs, D flip flop 818 assigns a high signal to the X port and a low signal to the X̄ port. Therefore, a low signal is furnished over line 822 to clear counter circuitry 802. This clearing operation in counter 802 causes the counter to interrupt the carry signal on line 803 and furnish at least one high signal on lines 810 with receipt of the next clock signal by counter circuitry 802. A high signal on any of the lines 810 causes the NOR gate 812 to output a low signal on line 814 which is then inverted by inverter 816 to provide a high signal on the clear line to D flip flop 818. This allows counter circuitry 802 to count and prevents D flip flop 818 from continuing to furnish a low clear signal on line 822 to counter circuitry 802.

The frequency of the HFVCO signals is approximately 192 times the frequency of the LPDS signals. However, the combination of counter circuitry 632 and counter circuitry 802 furnishes a count of 512 HFVCO signals before a carry signal can be generated by counter circuitry 802. During a light beam sweep, before counter circuitry 802 can provide a carry out signal for line 803, a new LPDS signal arrives at D flip flop 818 causing it to clear the counter 802 once again starting the count over. Because 512 HFVCO signals are required before a carry signal can be generated, it is necessary that at least two LPDS signal intervals occur without an LPDS signal being present before a GAP signal can be generated. Hence, no GAP signal can be generated if only a single LPDS signal should be missing during the sweep of a light beam across the target surface.

Figure 7:
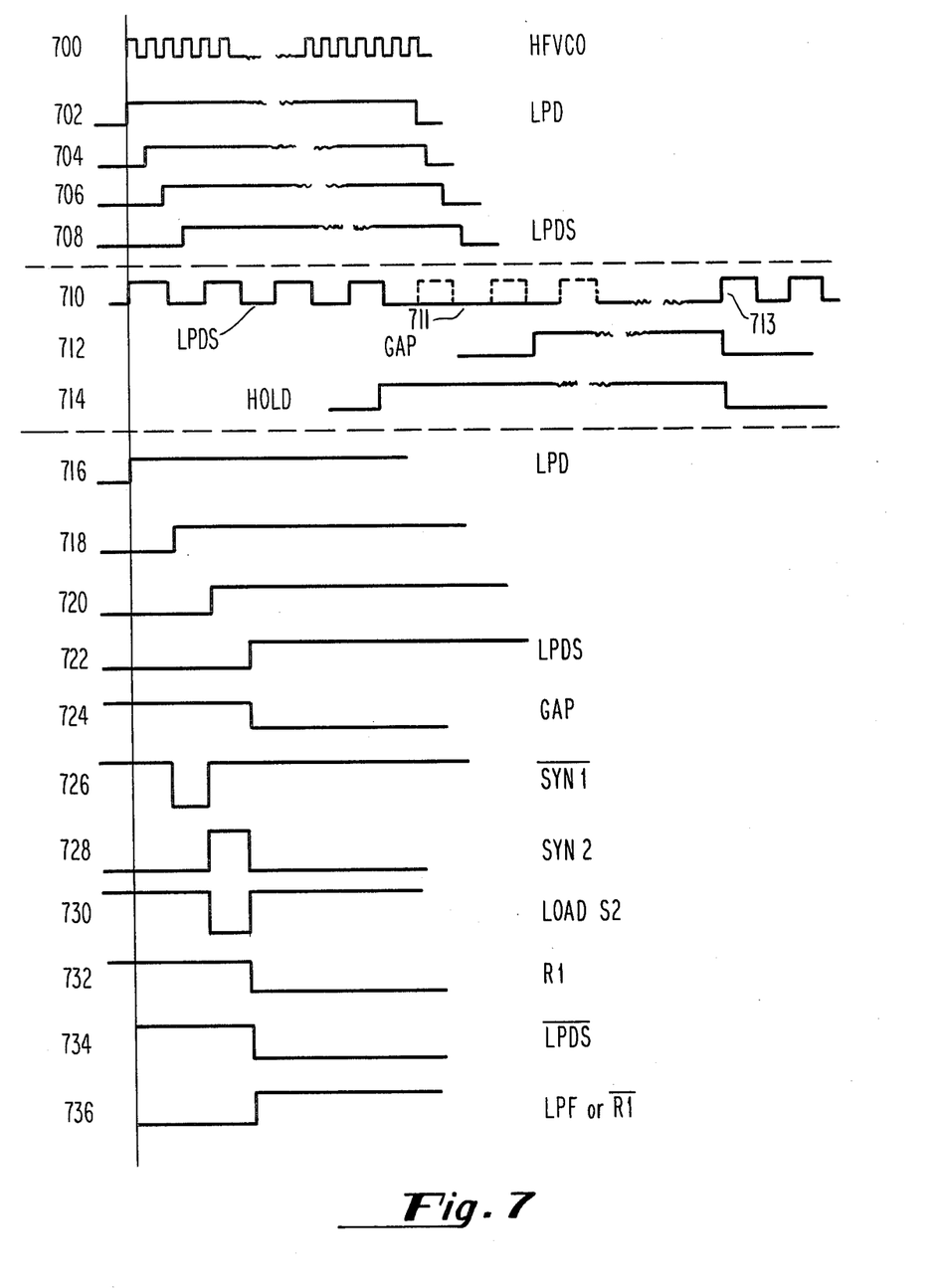
FIG. 7 is a timing diagram of the operation of the circuitry of FIG. 6.

Referring to FIG. 7, signal train 710 is a series of LPDS signals shown occurring on either side of dead time 711. Three dotted LPDS signals are shown occurring in the dead time to illustrate the timing relationship between the beginning of the GAP signal shown as signal 712, and the last of the LPDS signals occurring at the end of a light beam sweep. FIG. 7 shows that the GAP signal 712 does not occur until after at least two LPDS signal periods have gone by without the occurrence of an LPDS signal. The GAP signal 712 stops with the occurrence of the first LPDS signal 713 occurring with the beginning of the next light beam sweep across the target surface.

Figure 9:
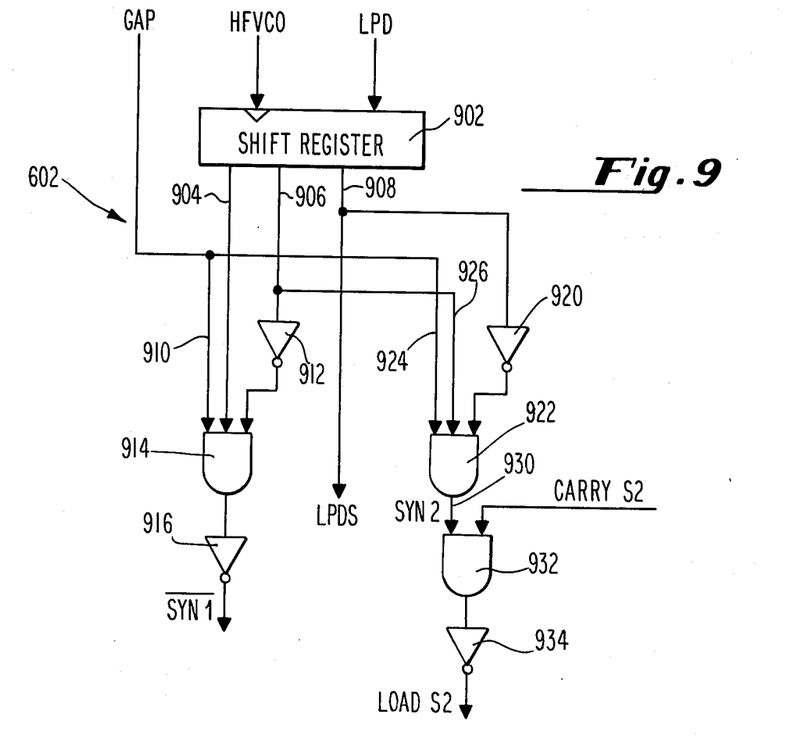
FIG. 9 is a circuit schematic of a second portion of the circuitry of FIG. 6.

Referring now to FIGS. 7 and 9, synchronizer circuitry portion 602 is shown in detail. It comprises a shift register 902, the shift register being a TTL 74LS194 device. An LPD signal such as LPD signal 702 of FIG. 7 is loaded into shift register 902 by an HFVCO signal. By the action of the shift register 902, the output on line 904 is delayed one HFVCO signal and is depicted as signal 704 in FIG. 7. Similarly, the next HFVCO signal causes another delayed output on line 906, shown as signal 706 in FIG. 7. With the arrival of the third HFVCO signal to shift register 902 after the arrival of the LPD signal 702 an LPDS signal is provided on output line 908 from the shift register 902. Hence, the operation of shift register 902 is summarized in FIG. 7 by inspection of signals 700 through 708.

The input signals to synchronizer circuitry portion 602 comprise the LPD signals from digitizer 146 in FIG. 6, the GAP signal from gap detector circuitry portion 630 shown in FIG. 8 and HFVCO signals from the VCO 604 in FIG. 6. Synchronizer circuitry portion 602 in turn outputs LPDS signals, and ancillary synchronization signals $\overline{SYN\ 1}$ and LOAD S2. FIG. 9 shows that $\overline{SYN\ 1}$ is generated by gating the GAP signal on line 910 with the output of shift register 902 on line 904, and the output of shift register 902 on line 906 inverted by inverter 912. Each of these three signals are transmitted to AND gate 914 and the output is inverted by inverter 916. The output of inverter 916 is the $\overline{SYN\ 1}$ signal which is furnished to both the hold circuitry portion 636 and the divide by 16 counter 606 in FIG. 6.

The synchronizer circuitry portion 602 also furnishes the LOAD S2 signal which is generated by gating the GAP signal over line 924 with the signal on line 906 from the shift register 902 over line 926, and inverted LPDS signals through inverter 920. These three signals are transmitted to AND gate 922 whose output is labelled the SYN 2 signal on line 930. The SYN 2 signal and a Carry S2 signal from divide by 12 counter 608 in FIG. 6 are gated through AND gate 932 and then inverted by inverter 934. The output of inverter 934 is the LOAD S2 signal which is furnished by the synchronizer circuitry portion 602 to the divide by 12 counter 608 in FIG. 6.

The relationship of these signals can be seen in FIG. 7. Signal 716 is an enlarged version of the LPD signal 702 in FIG. 7. The signal over line 904 from shift register 902 is labelled signal 718 in FIG. 7 and this signal is shown delayed relative to the LPD signal 716. The delay represents one HFVCO signal. In FIG. 7 this delay is shown enlarged over the normal HFVCO duration of signal 700 in FIG. 7. Continuing, the signal on line 906 from shift register 902 is shown delayed by two HFVCO signals relative to the LPD signal and is labelled signal 720 in FIG. 7. Signal 722 is the LPDS signal and by operation of shift register 902 is delayed three HFVCO signals beyond the arrival of LPD signal 716. GAP signal 724 is shown terminating with the arrival of the leading edge of the first LPDS signal arriving at D flip flop 818 in FIG. 8. Because the $\overline{\text{SYN}}$ 1 signal is formed by gating signal 718 and the inverse of signal 720, the $\overline{\text{SYN}}$ 1 signal can only occur as a pulse lasting between the leading edge of signal 718 and the leading edge of signal 720. The $\overline{\text{SYN}}$ 1 signal 726 in FIG. 7 is shown as a low signal because it is inverted by inverter 916 in FIG. 9. The $\overline{\text{SYN}}$ 1 signal is only generated when a GAP signal is present as a result of the gating of the GAP signal over line 910 with the signal from line 904 and the inverted signal from 906 in FIG. 9. Signal 728 in FIG. 7 is labelled SYN 2 and is the result of gating the 906 signal from shift register 902 with an inverted LPDS signal. As a result SYN 2 is shown as a high pulse whose duration lasts between the leading edge of signal 720 and leading edge of signal 722 in FIG. 7. SYN 2 only occurs during the presence of GAP signal 724 as a result of gating the GAP signal with AND gate 922 in FIG. 9. LOAD S2 which is furnished by synchronizer circuitry portion 602 to divide circuitry 608 is the result of inverting SYN 2 by inverter 934 in FIG. 9.

Referring to FIGS. 6 and 7, the LOAD S2 and $\overline{\text{SYN}}$ 1 signals are generated at specific times before the generation of the LPDS signal so that the arrival of the first LPDS signal at the beginning of a new light beam sweep at the phase detector 610 in FIG. 6 will be synchronized with the arrival of an R1 signal from the VCO and counter circuitry 606 and 608. This is accomplished in the following way: The $\overline{\text{SYN}}$ 1 signal 726 of FIG. 7 is transmitted to the load port of counter 606 which is programmed to load 0111 into the counter. With the arrival of the next HFVCO signal, the most significant bit in counter 606 goes high transmitting a character clock signal over line 152 and at the same time transmitting the character clock signal to the clock port of counter 608. At the same time that this HFVCO signal is increasing the count of counter 606 the LOAD S2 signal is arriving at counter 608 to load counter 608 with the binary numbers 0100. The most significant bit output of counter 608 is the R1 signal and it is low so long the most significant bit of counter 608 is zero. Since the LOAD S2 signal causes a 0100 to be loaded into counter 608, signal R1 will remain low for four character clock signals from counter 606. This corresponds to 64 HFVCO signals since counter 606 is allowed to count to 16 between character clock signals.

A low signal will occur on the most significant bit output of counter 608 as soon as the LOAD S2 pulse ceases. This is shown as signal 732 in FIG. 7 where signal R1 is high until the end of signal 730 in FIG. 7. At this time, R1 goes low. We see from FIG. 7 that R1 goes low at exactly the same time that LPDS signal 722 goes high or at the same time that LPDS, signal 736, goes low. This insures that the leading edge of R1 in phase detector 610 is in phase with the leading edge of the first LPDS signal arriving from synchronizer circuitry portion 602.

After the initial synchronization of signal R1 with the LPDS signals, R1 from counter circuitry 608 will repeat every 192 HFVCO signals. However, the HFVCO signals will vary in frequency as a result of the voltage controlled VCO 604 in FIG. 6. This will enable R1 to stay in phase track with the varying frequency LPDS signals. The gap detector circuitry 630 in cooperation with synchronizer circuitry portion 602 in FIG. 6 furnishes ancillary synchronization signals, LOAD S2 and $\overline{\text{SYN}}$ 1, to counter circuitry 606 and 608 respectively to furnish a fast synchronization means for synchronizing the variable clock signal outputs on line 152 with the first of the LPDS signals received from the fiber optic assembly 142.

Figure 10:
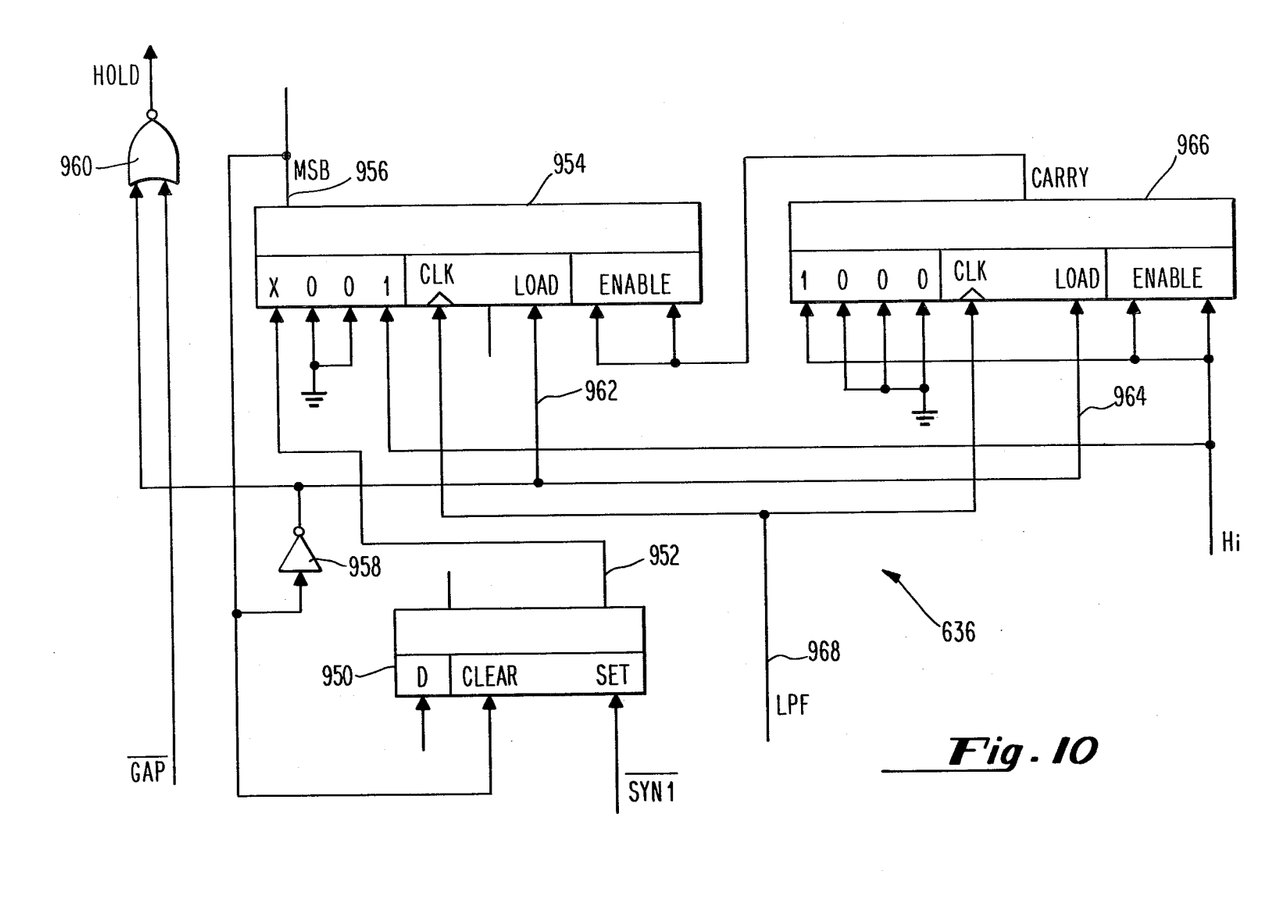
FIG. 10 is a circuit schematic of a third portion of the circuitry of FIG. 6.

FIG. 10 describes in detail hold circuitry portion 636 of FIG. 6. It will be recalled that the hold circuitry blanks the output of phase detector circuitry 610 during the dead time of the sweep to prevent a large frequency change in the VCO. When the $\overline{\text{SYN}}$ 1 signal arrives at D flip flop 950 it sets D flip flop to provide a low signal over line 952 to the most significant bit load position of counter circuitry 954. The most significant bit output 956 of counter 954 had previously been high and this high signal is inverted by inverter 958 to provide a low signal to NOR gate 960 and to provide low load signals to the lines 962 and 964 of counters 954 and 966 respectively. With the next LPF or $\overline{\text{R1}}$ signal (736 in FIG. 7) arriving over line 968, counter circuitry 954 is loaded with a 0001 while counter 966 is loaded with a 1000. As soon as a 0 appears at the most significant bit output line 956, it is transmitted to NOR gate 960 through inverter 958 as a high signal. Also, the low signal is transmitted to clear flip flop 950 setting a high signal in line 952 which will be loaded into counter 954 with the next low load signal over line 962. The GAP signal, which is the inverse of a $\overline{\text{GAP}}$ signal, also goes high at this time and the output from OR gate 960 which is the hold signal goes low. The two counters 954 and 966 are therefore allowed to count from the previously loaded numbers until the most significant bit of counter 954 provides a high signal. This is exactly 105 LPF signals after the start of the count. This is designed to correspond to the number of apertures present in the preferred embodiment fiber optic assembly unit 140.

After 105 LPF counts it is known that a dead time will occur since the laser sweep of the target surface is finished. At this point it is desirable to provide a high hold signal from NOR gate 960. This is accomplished because the most significant bit output of counter 954 goes high after 105 counts and is inverted through inverter 958 and becomes a low signal in NOR gate 960. Hence, a hold signal is provided as soon as the last LPF signal of a laser sweep is finished. The hold signal is prevented from going low because the high signal on line 956 is transmitted through inverter 958 as a low signal to load counter 954 with a one in the most significant bit with each clock pulse. A one is loaded at this time since D flip flop 950 had been cleared previously by a low output from the most significant bit of counter 954 during a previous count. No set signal is furnished to D flip flop 950 from the time that a zero first appears on line 956 from counter 954 until the next $\overline{\text{SYN}}$ 1 signal arrives to thereby restart the count of 105 LPF signals by the counter circuitry 954 and 966.

FIG. 7 shows the relationship of the hold signal 714 to the train of LPDS signals 710. By operation of the circuitry described in FIG. 10 the hold signal is caused to go high with the termination of the last LPDS signal. This hold signal continues until the beginning of a first LPDS signal 713 after the dead time has occurred between laser beam sweeps. Unlike the GAP signal, it will be noted that the hold signal is caused to start immediately after the last LPDS signal. Therefore, the GAP signal alone would be unsuitable since the voltage controlled oscillator would be allowed to drift considerably between the termination of the last LPDS signal and the beginning of the GAP signal 712. Refer to FIG. 6, the high hold signal is transmitted over line 637 to gates 619 and 621 to prevent the arrival of low active signals at charge pump 612. Operation of the hold circuitry means 636 in combination with the gates 619 and 621 provide a means for stabilizing the voltage controlled oscillator during the time period occurring between successive light beam sweeps.

The present invention is adapted to operate not only with printers and recording systems as described in FIG. 1 but is also equally adapted to operate with flying spot scanning document readers. For example, in such a reader a laser light beam is caused to sweep across a target surface and be reflected therefrom. As the laser light beam scans the alphanumeric characters on a line of scan on the target surface it is modulated and reflected to a demodulator which takes the information from a modulated light beam and stores it for further processing. In such a system the demodulation of the light beam and subsequent storage takes place under the control of a clocking signal. The same tangential velocity errors are present in such a system as for the laser printer in FIG. 1.

It is not necessary using the invention as described herein to provide a fiber optic aperture to aperture spacing which bears any required numerical relationship to the dot to dot spacing present in the desired printed characters. The preferred embodiment as described herein had an aperture to aperture spacing which is approximately twelve times the dot to dot spacing in the printed characters. In other embodiments envisioned by this invention, the factor could be less than twelve or more than twelve, for example, thirty or more.

While the present invention has been disclosed in connection with a preferred embodiment thereof, it should be understood that there may be other embodiments which fall within the spirit and scope of the invention as defined by the following claims.

What is claimed is:

1. A beam feedback system for use in laser printers said printers having a light source for transmitting a collimated light beam along a first path, a character generator and a light beam modulator connected thereto, said light beam modulator responsive to modulation signals from said character generator to modulate said light beam, said beam feedback system comprising:
    a rotating reflection means disposed within said first path for sweeping said light beam incident thereon at a constant rate within a planar region;
    a surface to be swept, said surface disposed to intercept said planar region along a straight line;
    a beam splitting means disposed between said rotating reflection means and said surface and disposed at least partially within said planar region for reflecting at least a portion of said beam along a synchronization path;
    an array of fiber optic elements formed to provide a linear array of fiber optic apertures along said synchronization path whereby at least a portion of said beam enters said apertures as it moves along its synchronization path;
    at least one photodetector disposed to receive light signals from the opposite ends of said fiber optic elements from said array of apertures, said at least one photodetector transmitting electrical signals in response to said received light signals; and
    circuitry means connected between said at least one photodetector and said character generator for providing a variable clock signal synchronized to said electrical signals from said at least one photodetector, said clock signals connected to said character generator to gate said modulation signals from said character generator to said light beam modulator whereby said light beam is modulated according to data stored within said character generator, said circuitry means comprising:
    a phase locked loop including a phase detector and a high frequency voltage controlled oscillator; and
    fast synchronizing means for synchronizing said variable clock signal with the first of said received electrical signals at the beginning of a new sweep of said light beam.

2. The invention of claim 1 wherein said circuitry means further comprises a hold circuitry means for stabilizing said voltage controlled oscillator during the time period between successive light beam sweeps whereby the frequency of said voltage controlled oscillator remains constant during said time period.

3. A synchronization system for an optical sweeping apparatus comprising:
    a light source for transmitting a collimated light beam along a first path;
    a rotating reflection means disposed within said first path for periodically sweeping said light beam incident thereon within a planar region at a constant rate;
    a surface to be swept, said surface disposed to intercept said planar region along a straight line;
    a beam splitting means disposed between said rotating reflector means and said surface and disposed at least partially within said planar region, said beam splitting means for reflecting at least a portion of said beam along a synchronization path;
    an array of fiber optic elements formed to provide a linear array of fiber optic apertures along said synchronizing path whereby said at least a portion of said beam enters said aperture as it moves along its synchronization path;
    at least one photodetector disposed to receive light signals from the ends of said fiber optic elements opposite from said aperture array, said at least one photodetector transmitting electrical signals in response to said received light signals; and
    circuitry means connected to said at least one photodetector for providing a variable clock signal synchronized to said electrical signals from said at least one photodetector, said circuitry means comprising:
    a phase locked loop including a phase detector and a voltage controlled oscillator; and
    fast synchronization means for synchronizing the output of said voltage controlled oscillator with the first of said electrical signals received at the beginning of a sweep of said light beam.

4. The invention of claim 3 wherein said circuitry means further comprises hold circuitry means for stabilizing said voltage controlled oscillator during the time between successive sweeps of said light beam.

* * * * *